US012693184B2

(12) United States Patent
Alfano et al.

(10) Patent No.: US 12,693,184 B2
(45) Date of Patent: Jul. 28, 2026

(54) SYSTEM AND METHOD FOR CARRYING OUT STABILITY TESTS ON A VESSEL

(71) Applicant: 3J MARINE S.R.L., Rome (IT)

(72) Inventors: Andrea Alfano, Angri (IT); Giancarlo Raiola, Angri (IT)

(73) Assignee: 3J MARINE S.R.L., Rome (IT)

( * ) Notice: Subject to any disclaimer, the term of this patent is extended or adjusted under 35 U.S.C. 154(b) by 284 days.

(21) Appl. No.: 18/567,601

(22) PCT Filed: Jul. 29, 2022

(86) PCT No.: PCT/IB2022/057069
§ 371 (c)(1),
(2) Date: Dec. 6, 2023

(87) PCT Pub. No.: WO2023/007457
PCT Pub. Date: Feb. 2, 2023

(65) Prior Publication Data
US 2024/0272029 A1 Aug. 15, 2024

(30) Foreign Application Priority Data
Jul. 30, 2021 (IT) ........................ 102021000020546

(51) Int. Cl.
*G01M 1/12* (2006.01)
*B63B 79/30* (2020.01)

(52) U.S. Cl.
CPC .............. *G01M 1/12* (2013.01); *B63B 79/30* (2020.01)

(58) Field of Classification Search
None
See application file for complete search history.

(56) References Cited

U.S. PATENT DOCUMENTS

| | | | | |
|---|---|---|---|---|
| 4,858,137 | A | * | 8/1989 | Bradley .................. B63B 79/10 340/689 |
| 5,178,488 | A | * | 1/1993 | Stokoe .................... B63B 79/10 414/678 |
| 8,934,023 | B2 | * | 1/2015 | Webb ..................... H04N 23/54 348/208.99 |

FOREIGN PATENT DOCUMENTS

| | | |
|---|---|---|
| CN | 108382528 A | 8/2018 |
| CN | 111791999 A | 10/2020 |

(Continued)

OTHER PUBLICATIONS

International Search Report and Written Opinion of the International Searching Authority issued for International PCT Application No. PCT/IB2022/057069 on Nov. 3, 2022.

*Primary Examiner* — Eric S. McCall
*Assistant Examiner* — Nigel H Plumb
(74) *Attorney, Agent, or Firm* — Howson & Howson LLP

(57) ABSTRACT

A system and a method for carrying out stability tests on a vessel are provided. In order to assess the stability of the vessel, it is of utmost importance to know the position of its center of gravity, and in particular of its center of gravity in the vertical direction. The system and method disclosed herein provide stability tests that include determining the position of the center of gravity of a vessel ashore, i.e., without the vessel having to be put in the water. Stability tests can thus be carried out in the same shed in which the vessel is being built, without the vessel having to be transported to the nearest water basin. In addition, the stability tests can be carried out at any stage of the process of construction and set-up of the vessel, and may also possibly be repeated several times at subsequent stages of the process.

18 Claims, 5 Drawing Sheets

(56)                     References Cited

FOREIGN PATENT DOCUMENTS

| KR | 20160059217 A | 5/2016 |
| KR | 20190055407 A | 5/2019 |
| RU | 2499722 C1 | 11/2013 |

* cited by examiner

[Fig. 1a]
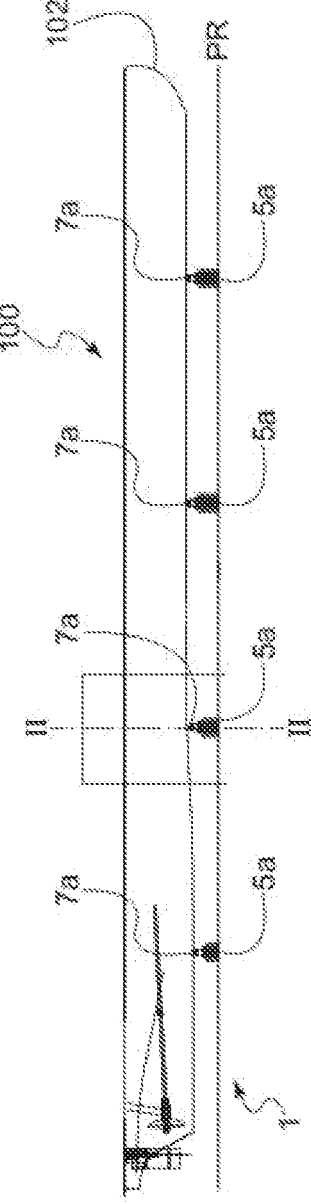

[Fig. 1b]
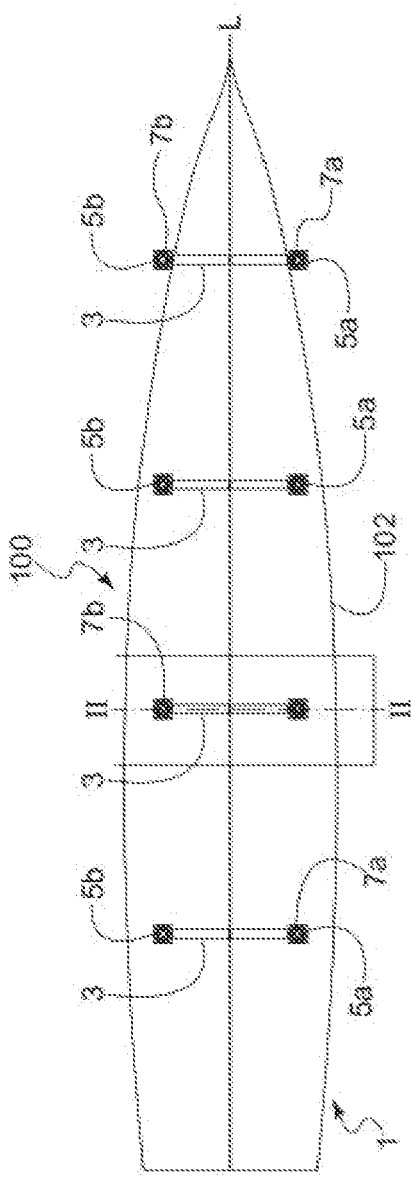

[Fig. 1c]
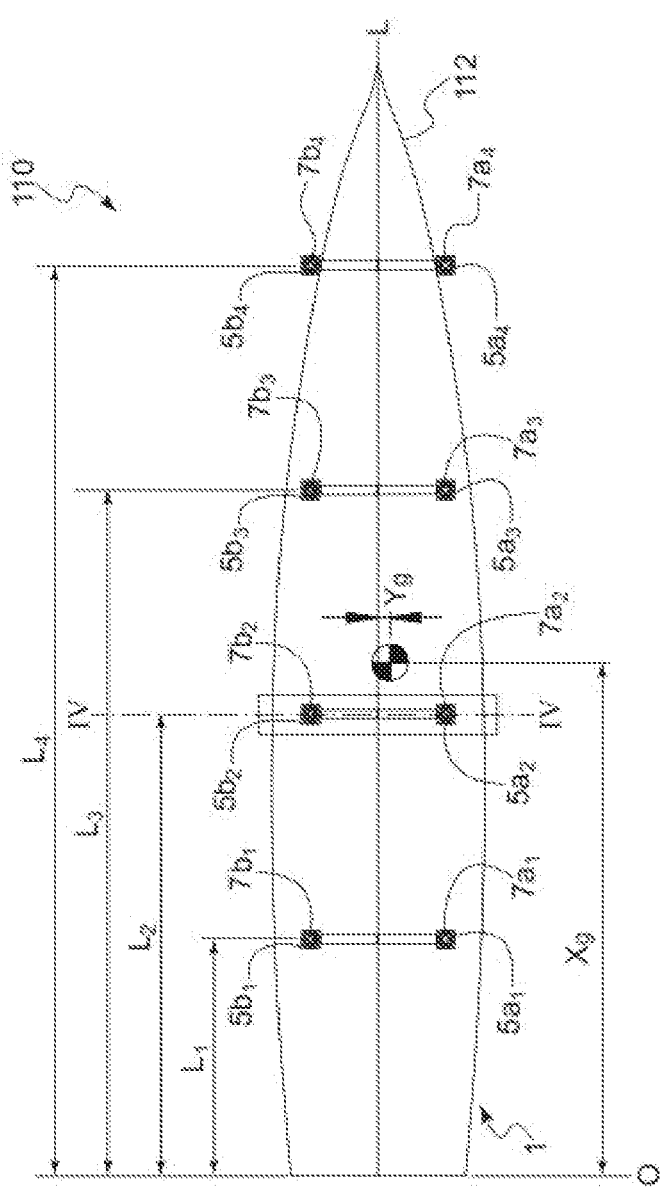

[Fig. 2]
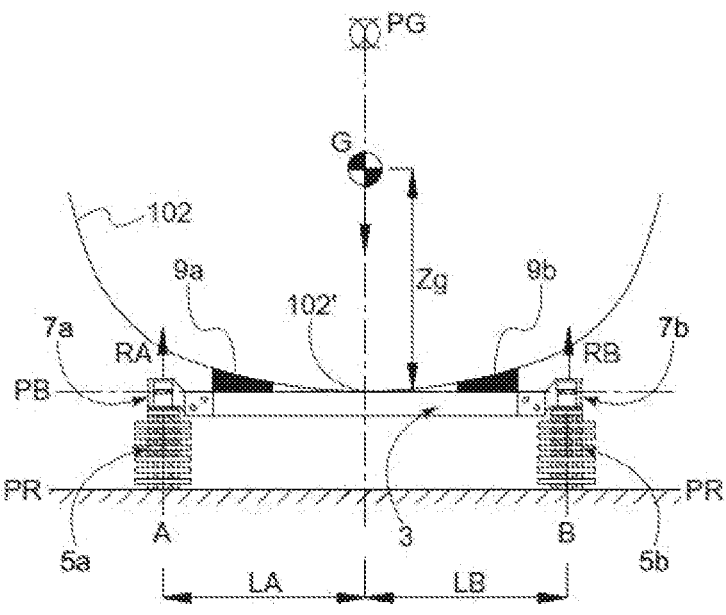
[Fig. 3]
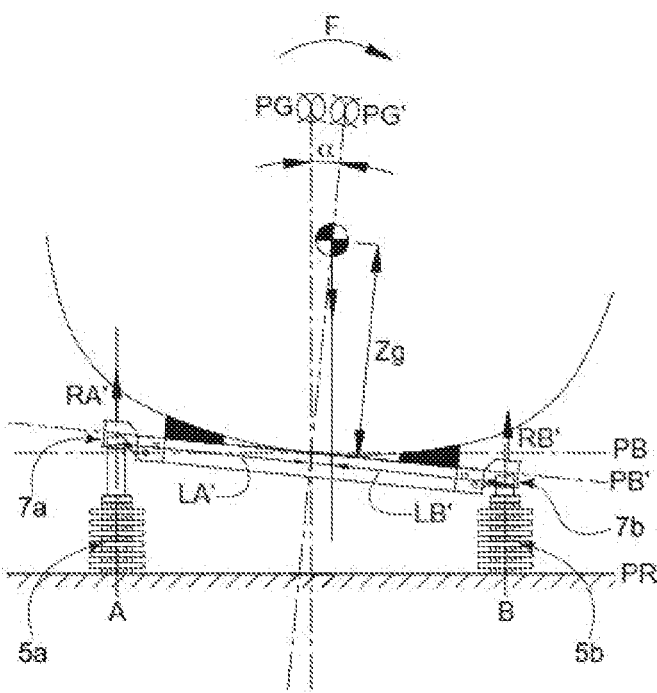

[Fig. 4]
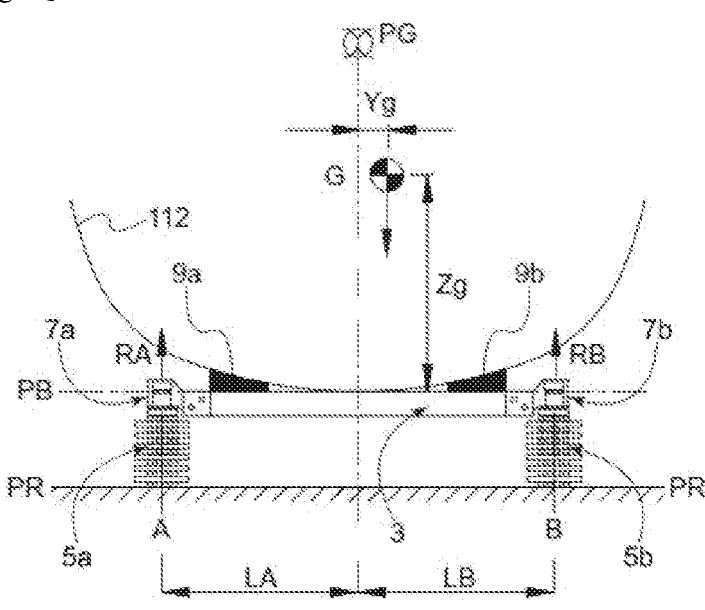
[Fig. 5]
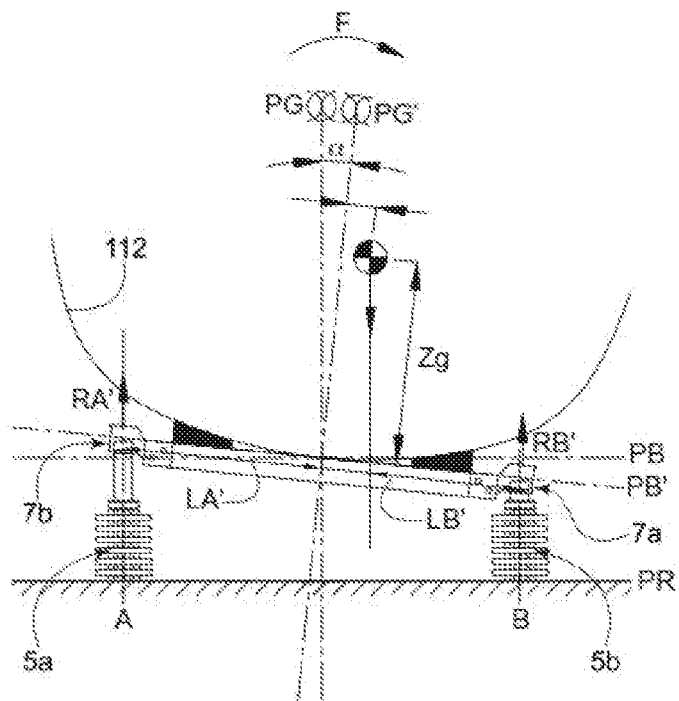

SYSTEM AND METHOD FOR CARRYING OUT STABILITY TESTS ON A VESSEL

TECHNICAL FIELD

The present invention relates to a system for carrying out stability tests on a vessel.

The present invention further relates to a method for carrying out such stability tests.

BACKGROUND ART

In order to assess the stability of a vessel, it is of utmost importance to know the position of the center of gravity thereof, and especially the position of the center of gravity thereof in the vertical, longitudinal and transverse direction.

Clearly, this position is determined theoretically at the designing stage.

However, this theoretical determination is subject to error.

In particular, in the case of vessels with a theoretically symmetrical structure, it is assumed that the center of gravity lies on the plane of symmetry of the vessel.

However, this theoretical assumption is hardly completely correct and, in practice, the center of gravity is often offset from the plane of symmetry.

Following launching of the vessel, however, such theoretical determination needs to be verified by means of practical tests, in order to highlight any offsets from the theoretical position of the center of gravity and the actual position, and to make, where required, the necessary corrections.

Such practical tests also allow highlighting errors that may occur at the designing stage.

According to prior art, such practical tests are carried out in water.

For this purpose, after construction is completed, the vessel is transported to a water basin and put in the water. The inclination of the vessel relative to a vertical plane passing through the longitudinal axis of the vessel itself is measured and the position of the center of gravity of said vessel is determined based on such measurement.

More specifically, in order to obtain accurate measurement of the position of the center of gravity of a vessel, known methods involve using a plurality of weights that are selectively and removably applicable to the vessel itself: the weights are applied to the vessel in a plurality of different positions, and each time data are collected regarding the inclination of the vessel relative to a vertical plane passing through the longitudinal axis thereof, so that a plurality of data sets are obtained; by analyzing the data sets obtained and correlating them with the magnitude and position of the weights used, the position of the center of gravity of the vessel can be determined by means of known formulas.

For example, document CN 111791999 describes a system for carrying out stability tests of the aforementioned type, which system provides for mounting, to the vessel, a track consisting of a pair of rubber rails arranged opposite to each other; a base made of plastics reinforced with glass fibers and equipped with wheels is placed on the track and weights of known magnitude are stacked on the base. The weights are carried on the base along the track and data relating to the inclination of the vessel are detected each time.

Similarly, document CN 108382528 describes a method for carrying out inclination tests on a ferry, in which two sets of balancing weights are arranged on the embarkation decks on the port and starboard sides near the boards of the vessel.

The balancing weights are located at different positions according to a positioning sequence and the test is carried out repeatedly, so as to obtain a plurality of data sets, and the inclination angle of the vessel is obtained by means of a known formula.

Document KR 20160059217 describes a similar system, though directed especially to the carrying out of tests on offshore platforms. Also according to the teachings of KR 20160059217, the position of weights intended for this purpose or of ballast water is changed in order to obtain a plurality of data sets, from which the position of the center of gravity of the platform is derived.

The systems and methods of the known type have obvious limitations.

Firstly, stability tests cannot take place at the same site where the vessel has been built (i.e. ashore, on a quay or inside a shed), but the vessel needs to be transported to the nearest water basin.

This makes the process of determining the center of gravity of the vessel lengthy and complex, especially when it is necessary to make corrective changes to the structure of the vessel and the tests need to be repeated several times.

Secondly, and even more importantly, known methods do not allow performing intermediate tests during the stages of construction and set-up of the vessel: as the tests are carried out in water, the vessel is subjected to such tests only when constructions thereof is completed, when the vessel is ready for launching.

Clearly, this risks making corrective changes, if necessary, extremely complex.

In addition, the imminent delivery of the vessel to the owner places a constraint on the time available to complete such corrective changes, which are therefore often limited or partial.

The main object of the present invention is to provide a system and a method for carrying out stability tests on a vessel that allow overcoming the limitations mentioned above.

In particular, the object of the present invention is to provide a system and a method for carrying out stability tests on a vessel that allow carrying out such tests also during intermediate stages of the process of construction and set-up of the vessel.

A further object of the present invention is to provide a system and a method for carrying out stability tests on a vessel that allow carrying out said stability tests at the yard where said vessel is being built.

SUMMARY OF INVENTION

The invention relates to a system and a method for carrying out stability tests on a vessel that allow carrying out said stability tests ashore, without the vessel having to be put in the water.

Stability tests can thus be carried out in the same shed where the vessel is being built, without requiring any travel to reach the nearest water basin.

Most of all, owing to the fact that the stability tests are carried out ashore, said stability tests can be carried out at any stage of the process of construction and set-up of the vessel, and may also possibly be repeated several times at subsequent stages of said process.

This advantageously enables early and accurate detection of any design errors, and makes any corrective actions to be taken easier, faster and cheaper.

The system according to the invention will generally comprise:

one or more supporting structures for the vessel, suitable for supporting said vessel above a reference plane;

means for varying the inclination of said one or more supporting structures with respect to said reference plane;

for each of said one or more supporting structures, detection means suitable for detecting the reaction exerted by said one or more supporting structures on the vessel supported on the supporting structure.

Preferably, a plurality of supporting structures are provided arranged at discrete positions along the direction of the longitudinal axis of the vessel to be tested.

Preferably, said supporting structures are arranged in a direction perpendicular to the longitudinal axis of said vessel to be tested.

In a preferred embodiment of the invention, the system according to the invention provides for a plurality of beams arranged parallel to one another at discrete positions along a first direction, parallel to the longitudinal axis of the vessel to be tested, and the longitudinal axes of said beams are oriented in a second direction, perpendicular to said first direction and thus perpendicular to the longitudinal axis of the vessel to be tested.

Preferably, said means for varying the inclination of said supporting structures comprise one or more pairs of elements, the components of each pair of elements being arranged on the opposite sides, with respect to the longitudinal axis of the vessel to be tested, of each of said supporting structures.

In a preferred embodiment of the invention, said means for varying the inclination comprise one or more pairs of pistons, the pistons of each pair being arranged on the opposite sides, with respect to the longitudinal axis of the vessel to be tested, of a respective supporting structure.

The stroke of each piston is variable in a controlled manner, whereby, by adjusting the stroke of each piston of each pair of pistons, it is possible to obtain a desired inclination of the supporting structures, and accordingly of the vessel.

Preferably, said means for detecting the reaction exerted by the supporting structure comprise one or more pairs of elements, the components of each pair of elements being arranged on the opposite sides, with respect to the longitudinal axis of the vessel to be tested, of the respective supporting structure.

In a preferred embodiment of the invention, said reaction-detecting means comprise one or more load cells, the load cells of each pair being arranged on the opposite sides, with respect the longitudinal axis of the vessel to be tested, of the respective supporting structure.

The method for carrying out stability tests that can be implemented with the system according to the invention provides the steps of:

with said one or more supporting structures kept parallel to said reference plane, determining the weight of the vessel, the reactions exerted and the position of the projection of the center of gravity of the vessel on the plane on which the supporting structures lie;

varying by a known angle the inclination of said one or more supporting structures with respect to said reference plane;

detecting the reactions exerted by said supporting structure at the set inclination angle;

on the basis of the detected reaction values, determining the position of the projection of the center of gravity of the vessel on the plane on which the supporting structures lie at the set inclination;

on the basis of the variation of the position of the projection of the center of gravity on the plane on which the supporting structures lie with respect to the initial position as well as on the basis of the predetermined inclination angle, calculating the distance in the vertical direction (perpendicular to the reference plane) between the center of gravity and the plane on which the supporting structures lie.

It will also be possible to provide for an iterative process in which the position of the center of gravity of the vessel (in particular the distance thereof, in the vertical direction, from the point at which the hull of the vessel rests on the one or more supporting structures) is calculated several times for different set values of the inclination angle, in order to obtain a more accurate determination of the position of said center of gravity.

In particular, during the step in which, with the support structure(s) kept parallel to the reference plane, the position of the projection of the center of gravity of the vessel on the plane in which the supporting structure(s) lie(s) is determined, the method according to the invention allows accounting for possible offsets of the center of gravity from the plane of symmetry of the vessel.

The method according to the invention further allows correcting the obtained value of the distance in the vertical direction between the center of gravity and the plane on which the supporting structure(s) lie(s), in order to take into account said offsets with respect to the plane of symmetry of the vessel.

Advantageously, this allows accounting for the offsets with respect to a perfectly symmetrical theoretical configuration of a vessel.

Even more advantageously, the method according to the invention allows accurate determination of the position (in the longitudinal, transverse and vertical direction) of the center of gravity of vessels having a structure involving components, even significant ones, of asymmetry.

For example, the method according to the invention is suitable for accurately determining the position (in the longitudinal, transverse and vertical direction) of the center of gravity of vessels in which the arrangement and/or structure of the superstructures rising from the main deck introduce components, even significant ones, of asymmetry into the overall structure of the vessel.

BRIEF DESCRIPTION OF DRAWINGS

Further features and advantages of the invention will become more evident from the ensuing detailed description of a preferred embodiment of the invention, provided by way of non-limiting example with reference to the annexed drawings, in which:

FIG. 1a is a schematic side view of a first example of a vessel mounted on a system for carrying out stability tests according to the invention;

FIG. 1b is a schematic plan view of the example of the vessel of FIG. 1a mounted on a system for carrying out stability tests according to the invention;

FIG. 1c is a schematic plan view of a second example of a vessel mounted on a system for carrying out stability tests according to the invention;

FIG. 2 is a cross-sectional view of FIGS. 1a and 1b taken along the line II-II, shown in a configuration in which the angle of inclination is set to zero;

FIG. 3 is a cross-sectional view of FIGS. 1*a* and 1*b* taken along the line II-II, shown in a configuration in which the angle of inclination is set to a known value which is other than zero;

FIG. 4 is a cross-sectional view of FIG. 1*c* taken along the line IV-IV, shown in a configuration in which the angle of inclination is set to zero;

FIG. 5 is a cross-sectional view of FIG. 1*c* taken along the line IV-IV, shown in a configuration in which the angle of inclination is set to a known value which is other than zero.

DESCRIPTION OF EMBODIMENTS

A first example of a vessel 100 with a hull 102 is visible in FIGS. 1*a* and 1*b*. According to this first example, the vessel 100 is assumed perfectly symmetrical with respect to the longitudinal axis L of the hull 102, whereby the center of gravity G of the vessel 100 lies on the plane of symmetry of the vessel.

In FIGS. 1*a* and 1*b* the vessel 100 is arranged on a system for carrying out stability tests 1 according to the invention.

The system 1 according to the invention advantageously allows carrying out said stability tests ashore, without the vessel to be tested having to be put in the water.

To this aim, the system comprises one or more supporting structures suitable for supporting the hull 102 of the vessel 100 above the ground or another reference plane PR.

In the shown embodiment, said supporting structures consist of a plurality of beams 3. Said beams 3 are arranged mutually parallel and located at discrete positions along a first direction, which is substantially parallel to the longitudinal axis L of the hull 102 of the vessel 100. Each beam 3 extends in a second direction, which is substantially perpendicular to said first direction and, accordingly, to the longitudinal axis L of the hull 102 of the vessel 100.

The supporting structures are mounted on the reference plane PR in such a way that their inclination with respect to said plane can be changed.

In the shown embodiment, each beam 3 is mounted on a pair of supports 5*a*, 5*b* adjustable in height and arranged at the opposite ends of the beam itself.

In this way, by increasing or reducing the height of either of the height-adjustable supports 5*a*, 5*b* at the opposite ends of a beam 3 it is possible to incline said beam 3 in a direction or in the opposite direction with respect to the reference plane PR.

In particular, the height variations of the supports 5*a*, 5*b* can be controlled, whereby the inclination angle of the respective beam 3 with respect to the reference plane PR can in turn be controlled.

Even more particularly, the height variations of the supports 5*a*, 5*b* can be controlled in such a way that the inclination angle with respect to the reference plane PR is the same for all beams 3.

In the shown embodiment, the supports for the beams are made in the form of pistons 5*a*, 5*b*, but this embodiment should not be understood in a limiting sense at all, and any other type of telescopic or otherwise height-adjustable support could be used as well, provided that the height variations of the supports can be controlled accurately.

Each of the supporting structures is provided with means for detecting the reaction exerted by the supporting structure itself on the hull 102 of a vessel 100 mounted on the supporting structures of the system according to the invention.

In the shown embodiment, said detection means are made in the form of load cells 7*a*, 7*b*, but this embodiment should not be understood in a limiting sense at all, and any other type of sensor capable of detecting an applied force could be used as well.

In particular, in the shown embodiment, each beam 3 is equipped with a pair of load cells 7*a*, 7*b* arranged at its opposite ends.

Preferably, said load cells 7*a*, 7*b* are arranged each aligned with the axis of a corresponding piston 5*a*, 5*b* of the respective beam 3.

Based on the value of a set inclination angle, which can be determined by controlling the height of the pistons 5*a*, 5*b* of each beam 3, and on the values detected by the load cells 7*a*, 7*b* of each beam, the system 1 according to the invention can determine the position of the center of gravity of the vessel 100 mounted on the beams 3, in particular the position of said center of gravity in the vertical direction (i.e., in a direction perpendicular to the reference plane PR), as will be described in detail below.

To this aim, the system 1 according to the invention will further comprise a control unit (not shown).

Said control unit will be capable of sending control signals to the actuators of the pistons 5*a*, 5*b* in order to change the height thereof and will further be capable of receiving, from the load cells 7*a*, 7*b*, the detected values of the reactions applied by each beam 3 to the hull 102 of the vessel 100.

Said control unit will further comprise a memory module in which the mathematical formulae linking the value of the inclination angle, the position of the detection means and the values concerning the reactions applied by the supporting means and detected by said detection means, to the position of the center of gravity of the vessel to be tested.

The operation of the system 1 according to the invention will be explained in detail below with reference to FIGS. 2 and 3.

At an initial step, or calibration step, shown in FIG. 2, the beams 3 are kept parallel to the reference plane PR. In other words, the height of the pistons 5*a*, 5*b* of the pair of pistons of each beam 3 is kept at the same value.

The vessel 100 is mounted (for example by means of cranes) on the beams 3 and is arranged on said beams so that the keel or, more generally, the point 102' at which the hull 102 rests on said beams is equidistant from the axes A, B of the pistons 5*a*, 5*b* of each beam 3.

As a result, the longitudinal axis L of the vessel 100 will also be equidistant from the axes A, B of the pistons 5*a*, 5*b* of each beam 3.

According to the initial hypothesis that the vessel 100 is symmetrical, the center of gravity G of the vessel 100 lies on a plane of symmetry PG perpendicular to the reference plane PR and passing through the longitudinal axis L of the vessel.

As a result, the projection of the center of gravity G on the base plane PB, i.e. on the plane on which the beams 3 lie, will be equidistant from the axes A, B of the pistons 5*a*, 5*b* of each beam 3.

In other words, the distance LA of the projection of the center of gravity G on the base plane PB from the axis A of a first piston 5*a* of each beam 3, which is the same as the distance of said first piston from the plane of symmetry PG, will be the same as the distance LB of the projection of the center of gravity G on the base plane PB from the axis B of the second piston 5*b* of said beam 3, which in turn is the same as the distance of the second piston from the plane of symmetry PG.

It should be noted that, as can be seen in FIG. 2, retaining elements 9a, 9b, for example made as wedges, can be provided on the beams 3, on the opposite sides of the center line of said beams.

The position and/or the shape of said retaining elements 9a, 9b can be variable, or said retaining elements 9a, 9b can be mounted on the beams 3 in a removable and replaceable manner, so that they can keep vessels with hulls of different shape and size in the correct position.

At this first calibration step, the system 1 according to the invention allows determining the total weight WTOT of the vessel 100.

At this step, the values of the reactions RA, RB measured by the load cells 7a, 7b of each beam 3 will also be detected.

In this way, the total weight WTOT of the vessel 100 will be determined through the sum of the readings of the values of the reactions of all the load cells 7a, 7b.

Assuming that the hull 102 of the vessel 100 has a symmetrical structure, at this step the reactions measured by the load cells 7a, 7b of each pair of load cells will be the same (RA=RB).

At a second step, or measurement step, shown in FIG. 3, the beams 3 are inclined with respect to the reference plane PR by a predetermined inclination angle α. In other words, the height of either of the pistons 5a, 5b or both pistons 5a, 5b of the pair of pistons of each beam 3 is changed so that said pistons have different heights. The change in the height of the pistons is controlled so as to be the same for all the pairs of pistons.

In particular, in the shown example, the height of the piston 5a (on the left in the Figures) is increased and the height of the piston 5b (on the right in the Figures) is kept unchanged, this resulting in the beam 3 being inclined clockwise by an inclination angle α (arrow F in FIG. 4).

In this configuration, unlike in the starting configuration, the base plane PB' will no longer be parallel to the reference plane PR, but it will be rotated by an angle equal to the inclination angle α with respect to said reference plane.

Similarly, the plane of center of gravity PG' will be rotated by an angle equal to the inclination angle α with respect to the starting configuration (perpendicular to the reference plane PR) of FIG. 2.

In this configuration, the values of the reactions RA', RB' measured by the load cells 7a, 7b of each beam 3 will again be detected and, because of the set inclination, they will be different from each other.

It will thus be possible to determine an offset of the center of gravity G with respect to the initial position, i.e. a change in the position of the projection of the center of gravity on the base plane PB', by means of the formulae:

$$LA' = LAB/WTOT * RA'$$

$$LB' = LAB/WTOT * RB'$$

$$y = LA' - LB'$$

where
y is the offset of the projection of the center of gravity G on the base plane PB' with respect to the initial position
LAB is the distance between the axes A and B of the pistons 5a and 5b of the beam 3
RA' is the reaction detected by the load cell 7a of the piston 5a in the configuration inclined by a known inclination angle α

RB' is the reaction detected by the load cell 7b of the piston 5b in the configuration inclined by the known inclination angle α
WTOT is the total weight of the vessel 100.
Said formula will advantageously be stored in the memory module of the control unit of the system 1.

Once the offset y of the projection of the center of gravity G on the base plane and the inclination angle α are known, the distance Zg of the center of gravity G from the base plane PB' can easily be calculated as $$Zg = y/\tan\alpha$$

This formula, too, will advantageously be stored in the memory module of the control unit of the system 1.

The inclination angle α will be other than zero and preferably lower (in module) than 10°, more preferably lower (in module) than 5°.

It will also be possible to set up an iterative process in which the distance Zg of the center of gravity G from the base plane PB' is calculated several times by setting different inclination angles, in order to obtain a more accurate assessment.

As mentioned above, the hypothesis that a vessel is perfectly symmetrical is hardly met.

There are also vessels that, by their very design, involve components—even significant ones—of asymmetry. It follows that the center of gravity G of the vessel does not lie on the plane of symmetry of the vessel itself.

First of all, the offset of the center of gravity from the plane of symmetry is an important factor in itself, which must be determined for a correct assessment of the stability of the vessel. Secondly, such offset remarkably affects the determination of the vertical distance of the center of gravity from the reference plane, which distance can be overestimated or underestimated if one erroneously assumes that the center of gravity lies on the plane of symmetry of the vessel.

In this respect, a second example of a vessel 110 comprising a hull 112 can be seen in FIG. 1c, where the offset of the center of gravity G of the vessel 110 from the plane of symmetry of the vessel itself is duly accounted for.

Referring to FIG. 1c, the method according to the invention makes it possible to detect the correct position in the longitudinal direction and in the transverse direction of the center of gravity G of the vessel 110.

The position in the longitudinal direction (in the direction of the longitudinal axis L of the hull 112) of the center of gravity G is given by the formula $$Xg = \sum_{i}[(RA_i \times L_i) + (RB_i \times L_i)]/WTOT$$

where
i is an integer varying from 1 to the overall number of pair of supports of the system 1 according to the invention;
$RA_i$ and $RB_i$ are the reactions measured by the load cells $7a_i$ and $7b_i$ provided at the supports $5a_i$ and $5b_i$ of the $i^{th}$ pair of supports when the height of the supports $5a$, $5b$ of the pair is kept at the same value;
$L_i$ is the distance in the longitudinal direction from a predetermined point of origin O of the supports $5a_i$ and $5b_i$ of the $i^{th}$ pair of supports;

WTOT is the total weight of the vessel 110, which, in example, too, is determined through the sum of the readings of the values of the reaction of all load cells.

In the example of FIG. 1*c*, *i* varies from 1 to 4, as there are provided four pairs of supports 5*a*, 5*b*. However, it is evident that the number of pairs of supports (and therefore the maximum number of i) can be chosen each time according to the needs of each specific application.

It is also evident that in the same way it would also have been possible to calculate the position in the longitudinal direction Xg of the center of gravity G of the vessel 100 of the former example (with the center of gravity on the plane of symmetry PG).

Advantageously, the formula set forth above for determining Xg will also be stored in the memory module of the control unit of the system 1.

The position in the transverse direction (in the direction perpendicular to the longitudinal axis L of the hull 112) of the center of gravity G is given by the formula $$Yg = \sum\nolimits_i [(RA_i \times LA) - (RB_i \times LB)]/WTOT$$

where i is an integer varying from 1 to the overall number of pair of supports of the system 1 according to the invention;

$RA_i$ and $RB_i$ are the reactions measured by the load cells 7*a_i* and 7*b_i* provided at the supports 5*a_i* and 5*b_i* of the $i^{th}$ pair of supports when the height of the supports 5*a*, 5*b* of the pair is kept at the same value;

LA and LB are the distances, in the transverse direction, of the supports 5*a_i* and of the supports 5*b_i*, respectively, of the $i^{th}$ pair of supports from the longitudinal axis L when the height of the supports 5*a*, 5*b* of the pair is kept at the same value;

WTOT is the total weight of the vessel 100.

Again, in the example of FIG. 1*c*, *i* varies from 1 to 4, as there are provided four pairs of supports 5*a*, 5*b*. Again, this example should not be considered as limiting and the number of pairs of supports (and therefore the maximum number of i) can be chosen each time according to the needs of each specific application.

Advantageously, the formula set forth above per determining Yg will also be stored in the memory module of the control unit of the system 1.

In the hypothesis made with reference to the first example of FIGS. 1*a* and 1*b*, in which the hull of the vessel has a symmetrical structure, the same formula set forth above for calculating Yg can be used; in this case, the reactions measured by the load cells of each pair of load cells are the same (RA=RB) and the offset of the center of gravity G in the transverse direction is zero.

However, in a more realistic situation, the reactions measured by the load cells of each pair of load cells are not the same ($RA_i$ $RB_i$) and the offset of the center of gravity G in the transverse direction is other than zero.

Referring to FIGS. 4 and 5, in the case of this second example of vessel 110 as well, the operation of the system 1 according to the invention will be entirely the same as the one explained in detail above with reference to FIGS. 2 and 3.

At an initial step, or calibration step, shown in FIG. 4, the beams 3 are kept parallel to the reference plane PR. In other words, the height of the pistons 5*a*, 5*b* of the pair of pistons of each beam 3 is kept at the same value.

At a second step, or measurement step, shown in FIG. 5, the beams 3 are inclined by a predetermined inclination angle with respect to the reference plane PR. In other words, the height of either of the pistons 5*a*, 5*b* or both pistons 5*a*, 5*b* of the pair of pistons of each beam 3 is changed so that said pistons have different heights. The change in the height of the pistons is controlled so as to be the same for all the pairs of pistons.

In particular, in the example shown, the height of the piston 5*a* (on the left in the Figures) is increased and the height of the piston 5*b* (on the right in the Figures) is kept unchanged, this resulting in the beam 3 being inclined clockwise by an inclination angle α (arrow F in FIG. 5).

Unlike the previous example, however, the projection of the center of gravity G on the base plane PB, i.e. on the plane on which the beams 3 lie, at the calibration step will not be equidistant from the axes A, B of the pistons 5*a*, 5*b* of each beam 3, but it will take into account the transverse offset Yg of the center of gravity G with respect to the plane of symmetry PG.

Turning to the measurement step, with the base plane PB' rotated by an angle equal to the inclination angle α with respect to the reference plane PR, said transverse offset Yg of the center of gravity will be taken into account as corrective factor.

After calculating the offset y of the projection of the center of gravity G on the base plane PB' with respect to the initial position in the same way as indicated above, a correct offset will be calculated as $$y' = x \pm Yg$$

The distance Zg of the center of gravity G from the base plane PB' will then be calculated as $$Zg = y'/\tan\alpha = (y \pm Yg)/\tan\alpha$$

The sign of the correction (+ or −) depends on the position of the center of gravity G with respect to the plane of symmetry, i.e. on whether the offset Yg is towards the port side or towards the starboard side.

In this case, too, it will be possible to set up an iterative process in which the distance Zg of the center of gravity G from the base plane PB' is calculated several times by setting different inclination angles, in order to obtain a more accurate assessment.

From the above description, it will be evident to the person skilled in the art that the system and the method according to the invention make it possible to achieve the objects set forth, as they allow carrying out stability tests for determining the position of the center of gravity of a vessel without the vessel having to be put in the water.

It will further be evident to the person skilled in art that the above detailed description of a preferred embodiment of the invention is not to be understood in a limiting sense, and that several modifications and variations are possible without thereby departing from the scope of protection as defined in the appended claims.

In particular, in the second example set forth above, the offset of the center of gravity with respect to a plane of symmetry parallel to the longitudinal axis of the vessel (Yg) has been calculated, and such offset in the transverse direction has been used as a corrective factor in determining the vertical coordinate (Zg) of the center of gravity.

It will be evident, however, that it is also possible to provide for calculating the offset of the center of gravity with respect to a plane of symmetry perpendicular to the longitudinal axis of the vessel, and such offset in the longitudinal direction can be used as a corrective factor in determining the vertical coordinate (Zg) of the center of gravity.

In this case, in order to determine said vertical coordinate, instead of inclining the vessel with respect to an axis parallel to the longitudinal axis of the vessel and detecting the reactions on the port side and the starboard side, the vessel will be inclined with respect to an axis perpendicular to the longitudinal axis of the vessel and the reactions at the bow and stern will be detected.

The invention claimed is:

1. A system for carrying out stability tests on a vessel, the system comprising:

one or more supporting structures, suitable for supporting the vessel above a reference plane;

inclination means that varies the inclination of the one or more supporting structures with respect to the reference plane; and detection means that detects a reaction exerted by the one or more supporting structures on the vessel, wherein the inclination means comprises, for each of the one or more supporting structures, one or more supporting elements that are adjustable in height, wherein the vessel has a longitudinal axis, and wherein the inclination means varies the inclination of the one or more supporting structures relative to the reference plane by rotating about an axis parallel to the longitudinal axis of the vessel or about an axis perpendicular to the longitudinal axis of the vessel, and wherein the system further comprises a control unit that controls variations in height of the one or more supporting elements.

2. The system according to claim 1, wherein the control unit is configured such that the control unit:

sends control signals to the inclination means for varying in a controlled manner the inclination of the supporting structures with respect to the reference plane;

receives from the detection means detected values of the reactions exerted by the one or more supporting structures on the vessel;

calculates, by means of formulas stored in a memory module of the control unit, the position, in a vertical direction, of the center of gravity of the vessel starting from a predetermined inclination angle and from the detected values received by the detection means for the predetermined inclination angle.

3. The system according to claim 2, wherein the control unit is configured such that the control unit:

calculates, by means of formulas stored in the memory module of the control unit, a position, in a direction transverse to the longitudinal axis of the vessel, of the center of gravity of the vessel;

uses the position in the direction transverse to the longitudinal axis of the vessel of the center of gravity of the vessel for correcting the position in the vertical direction of the center of gravity of the vessel.

4. The system according to claim 3, wherein the control unit is configured such that the control unit:

calculates, by means of formulas stored in the memory module of the control unit, a position, in a direction parallel to the longitudinal axis of the vessel, of the center of gravity of the vessel;

uses the position in the direction parallel to the longitudinal axis of the vessel of the center of gravity of the vessel for correcting the position in the vertical direction of the center of gravity of the vessel.

5. The system according to claim 2, wherein the control unit is configured such that the control unit:

calculates, by means of formulas stored in the memory module of the control unit, a position, in a direction parallel to the longitudinal axis of the vessel, of the center of gravity of the vessel;

uses the position in the direction parallel to the longitudinal axis of the vessel of the center of gravity of the vessel for correcting the position in the vertical direction of the center of gravity of the vessel.

6. The system according to claim 1, wherein the one or more supporting structures are a plurality of supporting structures arranged at discrete positions along a first direction and oriented along a second direction, which is substantially perpendicular to the first direction.

7. The system according to claim 6, wherein the plurality of supporting structures are a plurality of beams arranged parallel to one another at discrete positions along the first direction, each beam having a longitudinal axis that is oriented in the second direction, which is substantially perpendicular to the first direction.

8. The system according to claim 7, wherein for each beam of the plurality of beams, the detection means comprises one or more load cells.

9. The system according to claim 7, wherein the one or more supporting elements that are adjustable in height are made as pistons that are adjustable in height, each piston that is adjustable in height having a respective axis.

10. The system according to claim 1, wherein the inclination means comprises, for each of the one or more supporting structures, one or more pairs of supporting elements arranged on opposite sides of the supporting structure, at least one supporting element of each pair of supporting elements being adjustable in height, or both supporting elements of each pair of supporting elements being adjustable in height.

11. The system according to claim 1, wherein the one or more supporting elements that are adjustable in height are made as pistons that are adjustable in height.

12. The system according to claim 11, wherein for each beam of the plurality of beams, the detection means comprises a pair of load cells, which are arranged aligned with the axes of the pistons that are adjustable in height.

13. The system according to claim 1, wherein, for each of the one or more supporting structures, the detection means comprises one or more load cells.

14. A method for carrying out stability tests on a vessel by means of a system comprising one or more supporting structures, suitable for supporting the vessel above a reference plane;

inclination means that varies the inclination of the one or more supporting structures with respect to the reference plane;

detection means that detects a reaction exerted by the one or more supporting structures on the vessel, wherein the vessel has a longitudinal axis, wherein the inclination means comprises, for each of the one or more supporting structures, one or more supporting elements that are adjustable in height, and wherein the system further comprises a control unit that controls variations in height of the one or more supporting elements, the method comprising:

mounting a vessel onto the supporting structures, while the supporting structures are kept parallel to the reference plane;

measuring, by means of the detection means, values of the reactions exerted by the one or more supporting structures on the vessel;

determining, from the values measured by the detection means, a total weight of the vessel;

determining, from the values measured by the detection means, a first position of a projection of a center of gravity of the vessel on a plane on which the one or more supporting structures lie;

varying the inclination of the one or more supporting structures by a predetermined inclination angle by means of the inclination means, wherein the inclination means varies the inclination of the one or more supporting structures relative to the reference plane by rotating about an axis parallel to the longitudinal axis of the vessel or about an axis perpendicular to the longitudinal axis of the vessel;

measuring the values of the reactions exerted by the one or more supporting structures on the vessel by means of the detection means;

determining, from the values measured by the detection means, a second position of the projection of the center of gravity of the vessel on a plane on which the one or more supporting structures lie after having varied the inclination of the one or more supporting structures by the predetermined inclination angle;

determining a value of a variation of the position of the projection of the center of gravity of the vessel on the plane on which the one or more supporting structures lie as a difference between the first position and the second position;

determining a position, in a vertical direction, of the center of gravity of the vessel starting from the value of the variation of the position of the projection of the center of gravity of the vessel on the plane on which the one or more supporting structures lie and from the value of the inclination angle.

15. The method according to claim 14, wherein:

with the one or more supporting structures kept parallel to the reference plane, and with the vessel mounted on the one or more supporting structures, the values of the reactions exerted by the one or more supporting structures on the vessel are measured by means of the detection means;

an offset of the center of gravity of the vessel from a plane of symmetry of the vessel in a direction transverse to a longitudinal axis of the vessel is determined;

the offset of the center of gravity of the vessel from the plane of symmetry of the vessel in the direction transverse to the longitudinal axis of the vessel is used as a correction factor for determining the position in the vertical direction of the center of gravity of the vessel.

16. The method according to claim 15, wherein:

with the one or more supporting structures kept parallel to the reference plane, and with the vessel mounted on the one or more supporting structures, the values of the reactions exerted by the one or more supporting structures on the vessel are measured by means of the detection means;

a position of the center of gravity of the vessel in a direction parallel to a longitudinal axis of the vessel is determined;

the position of the center of gravity of the vessel in the direction parallel to the longitudinal axis of the vessel is used as a correction factor for determining the position in the vertical direction of the center of gravity of the vessel.

17. The method according to claim 14, wherein, for a same vessel, the position in the vertical direction of the center of gravity of the vessel is determined several times at several different values of the predetermined inclination angle.

18. The method according to claim 14, wherein:

with the one or more supporting structures kept parallel to the reference plane, and with the vessel mounted on the one or more supporting structures, the values of the reactions exerted by the one or more supporting structures on the vessel are measured by means of the detection means;

a position of the center of gravity of the vessel in a direction parallel to a longitudinal axis of the vessel is determined;

the position of the center of gravity of the vessel in the direction parallel to the longitudinal axis of the vessel is used as a correction factor for determining the position in the vertical direction of the center of gravity of the vessel.

\* \* \* \* \*